(12) United States Patent
Wernet et al.

(10) Patent No.: US 10,416,020 B2
(45) Date of Patent: Sep. 17, 2019

(54) METHOD AND APPARATUS FOR MONITORING FILL LEVEL OF A MEDIUM IN A CONTAINER

(71) Applicant: Endress + Hauser GmbH + Co. KG, Maulburg (DE)

(72) Inventors: Armin Wernet, Rheinfelden (DE); Gerd Bechtel, Steinen (DE); Kaj Uppenkamp, Wehr (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 4 days.

(21) Appl. No.: 15/311,243

(22) PCT Filed: May 27, 2015

(86) PCT No.: PCT/EP2015/061652
§ 371 (c)(1),
(2) Date: Nov. 15, 2016

(87) PCT Pub. No.: WO2015/185401
PCT Pub. Date: Dec. 10, 2015

(65) Prior Publication Data
US 2017/0115153 A1    Apr. 27, 2017

(30) Foreign Application Priority Data

Jun. 5, 2014 (DE) .................. 10 2014 107 927

(51) Int. Cl.
| G01F 23/24 | (2006.01) |
|---|---|
| G01F 23/00 | (2006.01) |
| G01F 23/26 | (2006.01) |

(52) U.S. Cl.
CPC .......... *G01F 23/24* (2013.01); *G01F 23/0061* (2013.01); *G01F 23/26* (2013.01); *G01F 23/268* (2013.01)

(58) Field of Classification Search
CPC .... G01F 23/263; G01F 23/0061; G01F 23/24; G01F 23/244; G01F 23/243; G01F 23/266
See application file for complete search history.

(56) References Cited

U.S. PATENT DOCUMENTS 4,125,822 A * 11/1978 Perren ................... G01M 3/045
324/696
4,147,050 A     4/1979 Rubel et al.
(Continued)

FOREIGN PATENT DOCUMENTS

| CN | 102203570 | 9/2011 |
|---|---|---|
| CN | 103339481 | 10/2013 |

(Continued)

OTHER PUBLICATIONS

English Translation of the International Preliminary Report on Patentability, WIPO, Geneva, CH—dated Dec. 15, 2016.
(Continued)

*Primary Examiner* — Peter J Macchiarolo
*Assistant Examiner* — Alexander A Mercado
(74) *Attorney, Agent, or Firm* — Bacon & Thomas, PLLC

(57) ABSTRACT

Method for monitoring a predetermined fill level of a medium (3) in a container (2) with at least one measuring probe (1) and an electronics unit (7), wherein the measuring probe (1) is operated alternately in the conductive and in the capacitive operating modes, wherein the measuring probe (1) is supplied with an exciter signal, which is composed of two different, time alternatingly sequential, periodic signal components, wherein in a first time interval the first periodic signal component is generated for the conductive operating mode and in a second time interval the second periodic signal component is generated for the capacitive operating mode, wherein from the capacitive or conductive operating mode response signal obtained from the measuring probe (1)

(Continued)

as a function of the current signal component, it is ascertained, whether the predetermined fill level has been reached, and wherein a report is generated upon the exceeding or subceeding of this fill level.

11 Claims, 7 Drawing Sheets

(56) References Cited

U.S. PATENT DOCUMENTS

| | | | | |
|---|---|---|---|---|
| 4,412,450 A * | 11/1983 | Franz | ................... | G01F 23/266 73/304 C |
| 4,585,996 A * | 4/1986 | Luce | ...................... | G01N 27/06 324/442 |
| 4,945,863 A * | 8/1990 | Schmitz | ............. | G01N 33/2852 123/1 A |
| 5,736,637 A * | 4/1998 | Evans | ................... | E21B 47/102 73/152.18 |
| 5,992,231 A * | 11/1999 | Mulder | ................... | G01F 23/24 73/304 C |
| 6,481,276 B1* | 11/2002 | Neuhaus | ................ | G01F 23/00 340/618 |
| 6,823,271 B1* | 11/2004 | Foss | .......................... | G01F 1/74 702/50 |
| 6,927,583 B2* | 8/2005 | Vanzuilen | ............ | G01N 27/226 324/686 |
| 7,401,513 B2* | 7/2008 | Szela | ................... | G01F 23/266 73/304 C |
| 7,415,366 B2* | 8/2008 | Florenz | .................... | G01D 3/02 702/50 |
| 2003/0020494 A1* | 1/2003 | Desmier | ............ | G01N 33/2829 324/667 |
| 2003/0117153 A1* | 6/2003 | McKenzie | ........... | G01N 27/226 324/663 |
| 2005/0039528 A1* | 2/2005 | Wernet | ................... | G01F 23/266 73/304 C |
| 2006/0212232 A1* | 9/2006 | Foss | .......................... | G01F 1/74 702/50 |
| 2008/0066544 A1* | 3/2008 | Tung | .................... | G01F 23/266 73/304 C |
| 2010/0005880 A1* | 1/2010 | Dieterle | ................. | G01F 23/24 73/304 R |
| 2010/0141285 A1* | 6/2010 | Wernet | ................... | G01F 23/24 324/754.22 |
| 2010/0147052 A1* | 6/2010 | Nelson | ............... | G01N 15/0656 73/28.01 |
| 2010/0301878 A1* | 12/2010 | Armbruster | ......... | G01F 23/0061 324/676 |
| 2011/0276281 A1* | 11/2011 | Wernet | .................. | G01F 23/241 702/55 |
| 2012/0182030 A1 | 7/2012 | Calciolari et al. | | |
| 2012/0191058 A1* | 7/2012 | Wu | ..................... | A61M 5/1684 604/404 |
| 2012/0268139 A1* | 10/2012 | Fend | ....................... | G01F 23/24 324/601 |
| 2013/0298667 A1* | 11/2013 | Bechtel | ................ | G01F 23/266 73/304 C |
| 2014/0152332 A1* | 6/2014 | Platte | ..................... | G01N 27/06 324/713 |
| 2014/0326066 A1* | 11/2014 | Mears | ................... | G01F 23/266 73/304 C |
| 2014/0339919 A1* | 11/2014 | Wernet | ................ | G01F 23/2967 307/116 |
| 2015/0002178 A1* | 1/2015 | Herb | ....................... | G01N 27/02 324/693 |
| 2016/0018248 A1 | 1/2016 | Wernet | | |
| 2017/0115153 A1 | 4/2017 | Wernet | | |
| 2017/0160121 A1* | 6/2017 | Florenz | ............... | G01F 23/0069 |

FOREIGN PATENT DOCUMENTS

| | | | | |
|---|---|---|---|---|
| DE | 19713267 A1 | | 7/1998 | |
| DE | 19808940 A1 | | 10/1998 | |
| DE | 10210504 A1 | * | 9/2003 | ........... G01F 23/244 |
| DE | 102007049526 A1 | | 4/2009 | |
| DE | 102011003158 A1 | * | 7/2012 | ........... G01F 23/266 |
| DE | 102014107927 A1 | | 12/2015 | |
| EP | 1067368 A1 | | 1/2001 | |
| EP | 2031358 A1 | | 3/2009 | |
| EP | 3152530 | | 4/2017 | |
| JP | 57035723 A | * | 2/1982 | ........... G01F 23/243 |
| WO | 2014131639 A1 | | 9/2014 | |
| WO | 2015185401 A1 | | 12/2015 | |

OTHER PUBLICATIONS

International Search Report, EPO, The Netherlands—dated Sep. 8, 2015.

Chinese Office Action in corresponding Chinese Application No. 201580028462.7, dated Oct. 29, 2018.

* cited by examiner

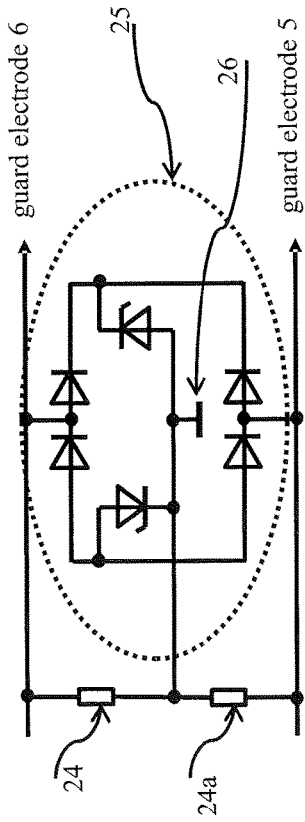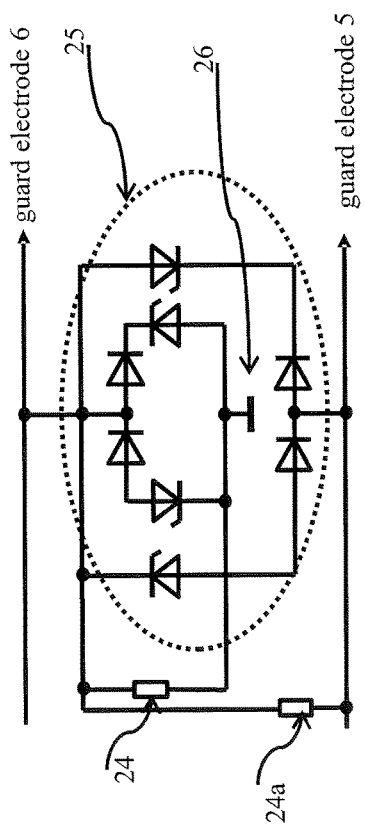

METHOD AND APPARATUS FOR MONITORING FILL LEVEL OF A MEDIUM IN A CONTAINER

TECHNICAL FIELD

The invention relates to method and apparatus for monitoring a predetermined fill level of a medium in a container.

BACKGROUND DISCUSSION

A predetermined fill level can be monitored, for example, by means of the conductive measuring method. This basic measuring principle is known from a number of publications. Fill level is monitored by detecting whether an electrical contact is established via the conductive medium between the sensor electrode and the wall of a conductive container or between the sensor electrode and a second electrode. Corresponding field devices are sold by the applicant, for example, under the mark, Liquipoint.

Fill level detection by means of a conductive measuring method reaches its limits, when the medium to be monitored has virtually no electrical conductivity (<0.5 µS/cm) or only a very low conductivity. A change of the conductivity of the medium relative to the conductivity of air is then too small to be able to be registered reliably by the measuring electronics. Media difficulty monitored with a conductive measuring method include e.g. distilled water, molasses and alcohols. Further problematic are media with an electrical conductivity of less than 1 µS/cm and a dielectric constant of less than 20. Falling in this range fall are especially oils and fats.

Suited in such case is the capacitive measuring method, which is likewise known from the state of the art. In such case, the fill level of the medium is ascertained from the capacitance of the capacitor formed by a probe electrode and the wall of the container or a second electrode. Depending on conductivity of the medium, either the medium or a probe insulation forms the dielectric of the capacitor. Also field devices based on the capacitive measuring principle are sold by the applicant in many different embodiments, for example, under the marks, Liquicap and Solicap.

Fill level detection by means of a capacitive measuring method is, indeed, possible, in principle, for both conductive and non-conductive media. However, for media with an electrical conductivity >50 µS/cm, insulation of the measuring probe is necessary. The impedance of this insulation is, in turn, disadvantageous in the case of clinging or accreting media.

Known from German Patent, DE 32 12 434 C2 for preventing accretion formation is the application of a guard electrode, which coaxially surrounds the sensor electrode and lies at the same electrical potential as the sensor electrode. Depending on the character of the accretion, there is in the case of this embodiment the problem of suitably producing the guard signal.

Furthermore, described in German Patent, DE 10 2006 047 780 A1 is a fill level measuring probe, which is insensitive to accretion formation over a large measuring range. In this known solution, an amplifying unit and a limiting element are provided, wherein the limiting element is arranged between the output of the amplifying unit and the guard electrode. The guard electrode is supplied via the amplifying unit and the limiting element, which is e.g. a resistor, with a guard signal. The sensor electrode is supplied analogously with the operating signal. An evaluation unit monitors fill level based on the electrical current signal tappable at the sensor electrode and the operating signal and/or the guard signal. The amplifying unit, which produces the guard signal, is limited by the limiting element. The signal, limited in its amplitude, is sent as exciter signal to the sensor electrode. Then, tapped from the sensor electrode is an electrical current signal, which in combination with the operating signal or the guard signal is taken into consideration for the purpose of monitoring the fill level.

Finally, known from German Patent, DE 10 2008 043 412 A1 is a fill level limit switch having a memory unit, wherein stored in the memory unit are limit values for different media located in a container. Upon exceeding or subceeding the limit value for the medium, a switching signal is produced. Especially, the limit value for the measured value can be so established with reference to the medium located in the container that an accretion formation does not interfere with reliable switching. Since accretion formation corrupts the measurement signal and, thus, falsely indicates an incorrect process variable, the limit value (which determines the switching point) is preferably so set that it lies outside of the region attainable for the measurement signal in the case of accretion. The apparatus can be embodied, in such case, as a capacitive or as a conductive, fill-level measuring device. Since the apparatus can automatically adjust to alternating media (e.g. also in the context of cleaning procedures such as CIP- and SIP processes) in the container by ascertaining, respectively calculating, the optimal switching point from the registered properties of the medium, complex adjustment procedures, which are usually necessary in the case of an alternation of the medium, can be omitted.

It would be desirable, if the fill level of a medium in a container could be monitorable with a measuring device independently of the electrical properties of the medium. Since the advantages and disadvantages of the capacitive and conductive measuring methods are opposite, a multisensor is promising, which can monitor fill level by means of both methods. Such a multisensor is distinguished by features including that it permits working alternately in a capacitive and in a conductive operating mode. In such case, a guard electrode can be supplementally provided for preventing accretion formation.

Different options are conceivable for concrete construction of such a field device. For example, a measuring probe with two electronic units can be provided, one for the capacitive and one for the conductive, operating mode. In order to be able to switch back and forth between the two modes, electrical switches can be supplementally installed, for example. This simply implementable example has, however, the disadvantage that the switches limit the achievable measuring resolution due to parasitic capacitance, which can be especially disadvantageous in the case of the capacitive operating mode.

The achievable measuring resolution in the capacitive operating mode depends on the particular geometric embodiment of the measuring probe as well as on the components used for the respective electronics unit. Of course, the measured capacitances depend, moreover, on, among other things, the properties of the medium. However, this dependence concerns the respectively current application, while the geometry of the measuring probe as well as the components of the electronics unit represent a constant influence.

The most important feature is the geometric embodiment of the measuring probe, since this fixes the range of the measured capacitances.

When the measuring probe is, for example, so embodied that after installation in the wall of the container it is flush with the wall, such as in the case of the variant sold by the applicant under the designation FTW33, the measured capacitances can lie in the range of femtofarads. If the measuring probe, in contrast, protrudes at least partially into the container, then the measured values for the capacitance lie up to a number of orders of magnitude thereabove.

Especially an evaluation of capacitances in the femtofarad range places highest requirements on the applied electronics unit.

SUMMARY OF THE INVENTION

An object of the invention, therefore, is to provide a method and an apparatus, with which a predetermined fill level of a medium in a container can be monitored independently of the electrical properties of the medium, and with which, simultaneously, a high measuring resolution is assured down to the femtofarad range.

This object is achieved according to the invention by a method for monitoring a predetermined fill level of a medium in a container with at least one measuring probe and an electronics unit, wherein the measuring probe is operated alternately in the conductive and in the capacitive measuring modes, wherein the measuring probe is supplied with an exciter signal, which is composed of two different, time alternatingly sequential, periodic signal components, wherein in a first time interval the first periodic signal component is generated for the conductive operating mode and in a second time interval the second periodic signal component is generated for the capacitive operating mode, wherein from the capacitive or conductive operating mode response signal obtained by the measuring probe as a function of the current signal component, it is ascertained, whether the predetermined fill level has been reached, and wherein a report is generated upon the exceeding or subceeding of this fill level.

In this way, the measuring probe can be operated by means of an electronics unit designed both for a capacitive as well as also for a conductive operating mode. In such case, the conductive operating mode is used for conductive media, while the capacitive operating mode is used for non- or poorly conductive media. The advantage of the conductive operating mode for media of high electrical conductivity (>5 μS/cm) is that the measuring probe has a direct connection to the medium, so that no further insulation is necessary.

The combining of capacitive and conductive measuring in a single electronics unit means, moreover, that no electrical switches need to be used. This, in turn, increases the achievable measuring resolution, since the application of electrical switches would introduce parasitic capacitances.

Used in a preferred embodiment for the exciter signal in the first time interval is a rectangular signal and in the second time interval a triangular signal or sine signal. The rectangular signal is thus used for operation of the measuring probe in the conductive operating mode and the triangular or sine signal is used for the capacitive operating mode. Especially a triangular signal is technically simple to produce.

It is, moreover, advantageous, when the rectangular signal and the triangular signal are so sized, respectively designed, that they have the same arithmetic average value. In this way, there arise from the different exciter signals no offset differences in the operating of the measuring probe.

In an additional preferred embodiment, at least one medium specific property, especially the electrical conductivity or dielectric constant, is ascertained from at least one response signal. Thus, besides the predetermined fill level also a process- and/or medium monitoring can be performed. Of course, for this, the measuring probe must be covered at least partially by medium. For example, process windows can be defined, in which changes of the electrical conductivity are detected, or, in the case of non-conductive media, the dielectric constant can be monitored.

From the possibility of an additional medium monitoring, it is, furthermore, possible, that there is associated with the measuring probe information, which sets the response signals or variables derived from such in a functional relationship to at least one property of the medium specific to the medium. From the functional relationship, in turn, switching points can be defined, which correspond to the exceeding and/or the subceeding of the predetermined fill level. Preferably, the response signal, respectively the associated switching point, is provided as a function of the ascertained, medium specific property in the conductive operating mode and/or in the capacitive operating mode.

In order to be able to conduct measurement operation automatically and without intervention of the operating personnel, preferably the medium specific property is ascertained first in the conductive operating mode. Then, based on the ascertained media property and the functional relationship, the associated switching point is determined. The medium specific property is preferably the electrical conductivity with $G=1/R$, wherein R is the ohmic resistance of the medium, or the dielectric constant is used.

In an especially preferred embodiment, in the case of non- or slightly electrically conductive media, the response signals obtained during application of the capacitive operating mode are evaluated. In the case of electrically conductive media, the measurement signals obtained during application of the conductive operating mode are evaluated, and, for media with a conductivity within a transitional region, the response signals of both operating modes are evaluated and the measured values won from the response signals are provided with corresponding weighting factors as a function of the conductivity of the medium. Such a method enables a continuous transition between conductive and non-conductive media. Moreover, it enables detection of possible formation of accretion on the measuring probe.

Of course, in the case of a highly conductive medium, the fill level does not have to be determined in the capacitive operating mode, since that measurement provides no additional information. Likewise, for slightly or non-conductive media, measurement in the conductive operating mode does not have to be performed. However, the measured value of the conductive measurement is used for the guard voltage, in order to obtain information concerning the conductivity of the medium.

The object of the invention is, moreover, achieved by an apparatus for monitoring a predetermined fill level of a medium in a container. Such apparatus comprises at least one measuring probe and an electronics unit, wherein the electronics unit is so embodied that it drives the measuring probe alternately in the conductive and capacitive operating modes, wherein the electronics unit supplies the measuring probe with an exciter signal, which is composed of two different, time alternatingly sequential, periodic signal components, wherein the electronics unit is so embodied that it generates in a first time interval the first periodic signal component for the conductive operating mode and in a second time interval the second periodic signal component for the capacitive operating mode, wherein from the response signal of the capacitive or conductive operating mode obtained by the measuring probe as a function of the current signal component, the electronics unit ascertains whether the predetermined fill level has been reached, and wherein the electronics unit generates a report upon the exceeding or subceeding of this fill level. The apparatus of the invention includes, thus, especially an electronics unit suitable for performing the method as claimed in claim 1.

In such case, it is advantageous, when a module for generating a rectangular signal and a module for generating a triangular signal or sinusoidal signal are provided.

In a preferred embodiment, the measuring probe is composed of a sensor electrode and a guard electrode. A guard electrode can eliminate or compensate the influence of accretion on the measuring probe.

In order to be able to achieve a high measuring resolution, the electronics unit must be specially designed and provided with certain components enabling a low capacitance operation of the measuring probe as well as a low capacitance evaluation of the measurement signals.

For evaluation in the conductive operating mode, it is advantageous to provide a measuring resistor, via which the ratio of the electrical current through the probe electrode and the electrical current through the guard electrode is determined. Furthermore, it is advantageous for the conductive operating mode, when at least one voltage divider is provided for generating the corresponding first signal portion.

For evaluation in the capacitive operating mode it is, in turn, advantageous, when at least one difference amplifier is provided, with which in the capacitive operating mode via the measuring resistor the difference of the voltages on the probe electrode and the guard electrode is determined.

In a preferred embodiment, at least one of the operational amplifiers is equipped with an input having a small input capacitance, especially this is that operational amplifier, through which the response signal measured in the capacitive operating mode is led.

Moreover, it is advantageous to provide an ESD (Electrostatic Discharge) protection circuit, which includes at least one diode and one bleeder resistor, wherein the ESD protection circuit is so embodied that the at least one diode and the at least one bleeder resistor are connected with the guard electrode and via the guard electrode with the ground connection.

In another preferred embodiment, at least one circuit board provided in the electronics unit is shielded with the guard voltage.

By these measures, it is assured that the operation and evaluation occurs with low capacitance in the electronics unit, such that the measuring resolution is clearly increased.

Finally, in a preferred construction, the measuring probe is so embodied that, after installation in the wall of the container, it is flush with the wall or at least partially protrudes inwardly into the container. Especially in the case of a geometric embodiment, in which the measuring probe is flush with the wall of the container, the capacitances measured in the capacitive operating mode lie in the range of femtofarads. In this case, a high measuring resolution, such as is assured by the present invention, is unavoidable. Of course, also other geometric embodiments, in the case of which the measuring probe protrudes, for example, at least partially inwardly into the container, fall within the scope of the invention. In the latter case, application of a solution of the invention also increases the accuracy of measurement of the field device.

BRIEF DESCRIPTION OF THE DRAWINGS

The invention will now be described more exactly based on the appended drawing, the FIGS. 1 to 7 of which show as follows:

FIG. 7 is an ESD protection circuit
a) from the state of the art,
b) in an embodiment of the invention.

DETAILED DISCUSSION IN CONJUNCTION WITH THE DRAWINGS

Figure 1:
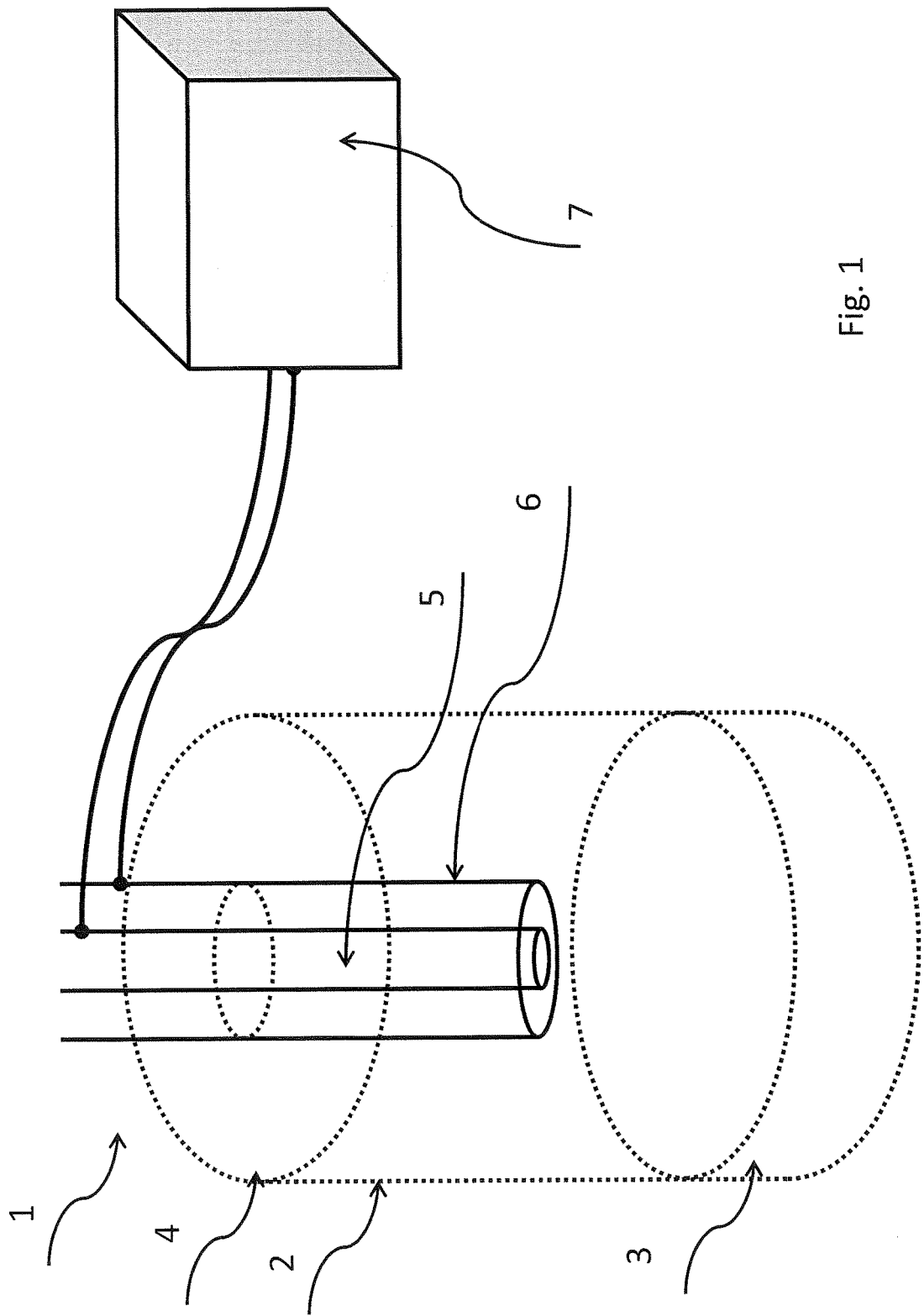
FIG. 1 is a schematic representation of a measuring electrode of the invention arranged in a container partially filled with medium.

FIG. 1 shows a typical construction of a measuring probe 1, by means of which a predetermined fill level can be monitored in the capacitive or conductive measuring method. The measuring probe 1 is arranged in a container 2, which is at least partially filled with a medium 3. In this case, the measuring probe protrudes from the upper side of the container into the container. Of course, the measuring probe 1 can also terminate at the wall of the container 4. Especially in the case of pipes or containers of small cross section, such an arrangement can be advantageous. The measuring probe 1 is composed, in the present example, of a measuring electrode 5 and a guard electrode 6, which serves for preventing formation of accretion. The measuring probe is connected outside of the container with an electronics unit 7, which is responsible for signal registration, evaluation and/or power supply. Especially, the electronics unit ascertains, based on the response signals produced in the capacitive and conductive operating modes, whether the predetermined fill level of the medium 3 in the container 2 has been exceeded and/or subceeded, and generates a corresponding report, respectively initiates a corresponding switching procedure.

Figure 2:
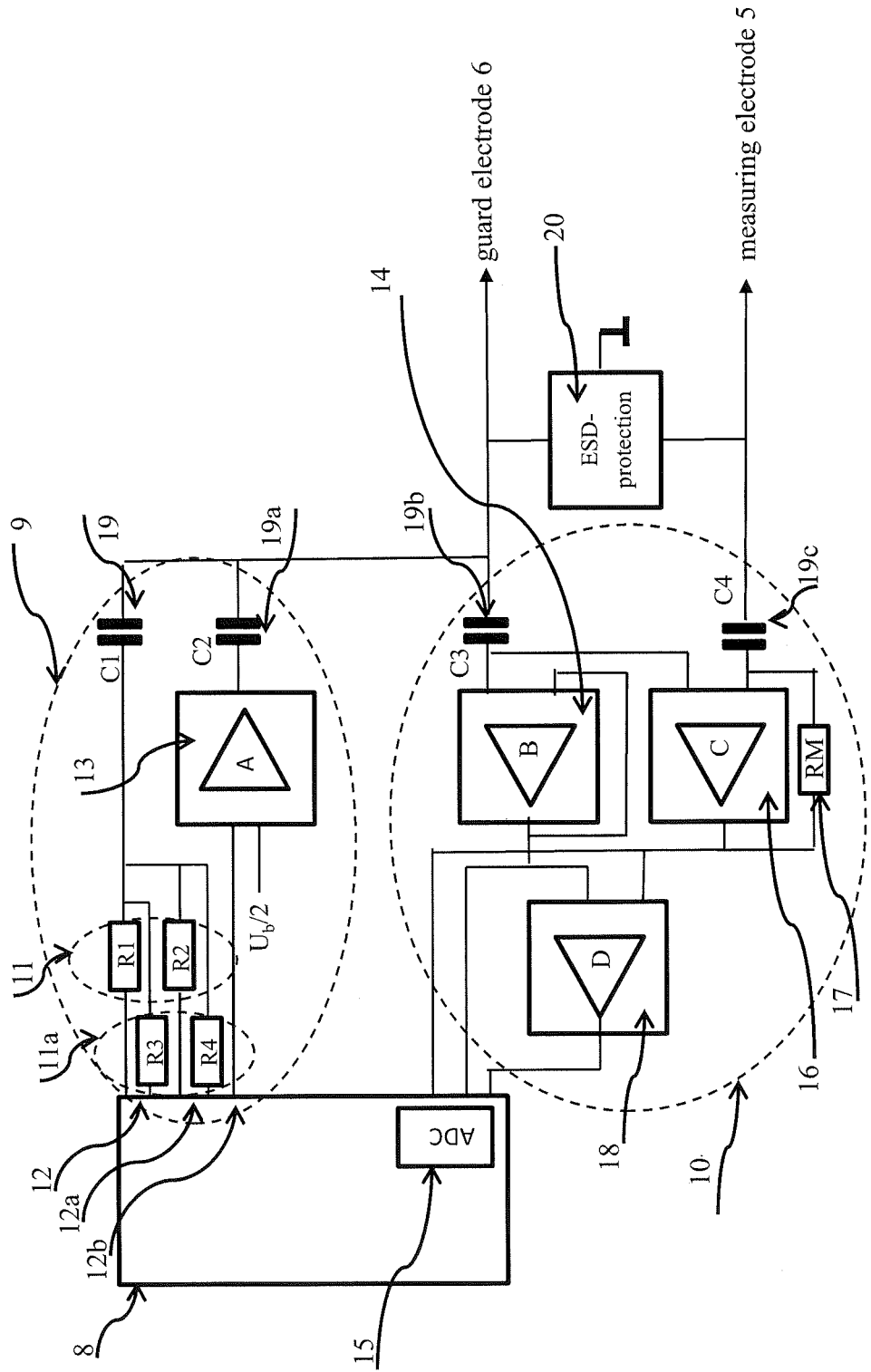
FIG. 2 is a block diagram of the electronics unit of the invention.

FIG. 2 shows a block diagram of an electronics unit of the invention, by means of which the measuring probe can be operated both in the capacitive as well as also in the conductive operating mode. As starting point, a microcontroller 8 is shown, such as is to be found in a wide variety of electronic units for field devices.

The electronics unit has a region 9 for producing the exciter signal and a region 10 for evaluation of the response signals as a function of the respective signal components.

Provided for producing a rectangular signal for the conductive operating mode are two voltage dividers 11, 11a, a low ohm voltage divider (R1/R2) 11 for highly conductive media and a high ohm voltage divider (R3/R4) 11a for slightly conductive media. The clocking of these two voltage dividers 11, 11a occurs via corresponding ports/outputs 12, 12a of the microcontroller 8. Via an additional port/output 12b of the microcontroller in the example shown here, a triangular voltage is generated via an integration amplifier (block A) 13 to serve as capacitive exciter signal.

The region 10 for evaluation of the response signals dependent on the respective signal components includes the blocks B to D, which comprise all three operational amplifiers. In order to minimize the influence of parasitic effects from the probe structure and from accretion formation on the measuring probe, guard technology as disclosed in German Patent, DE00102008043412A1 is applied.

Block B 14 is provided by a non-inverting amplifier, which sends the reference signal, in this case, the guard voltage, to the analog to digital converter (ADC) 15 of the microcontroller 8. B 14 can likewise be used to shield at least one circuit board. Also block C 16 includes a non-inverting amplifier, which is responsible for delivering the response signal to the ADC 15. Also a measuring resistor 17 is provided, with which the difference of the voltages on the probe electrode and the guard electrode is determined.

For evaluation of the response signal won from the capacitive measuring, block D 18 is supplementally required, which includes a difference amplifier and is responsible for subtracting and amplifying the two response signals from the measuring and guard electrodes. This happens via the measuring resistor 17. The difference is then directly proportional to the capacitance at the probe. By application of a method of the invention and an apparatus of the invention, a measuring resolution of a few femtofarad is possible.

Provided, moreover, are four decoupling capacitors 19, 19a, 19b, 19c, which filter the direct voltage portions from the respective signals. Finally shown is the ESD protection circuit 20, as well as the measuring probe 1 arranged in the container 2 and composed of the measuring electrode 5 and the guard electrode, and their connections to the electronics unit.

Figure 3A:
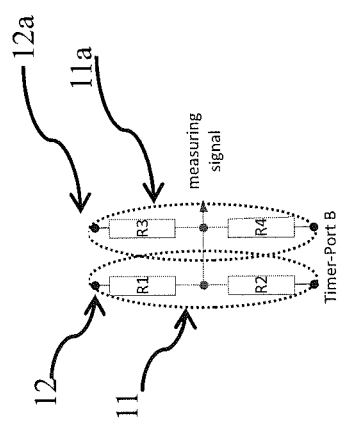
FIG. 3 is an illustration of the production of the signal portion for the conductive operating mode
a) sketch of two voltage dividers of the invention,
b) rectangular signals for the conductive operating mode as a function of time,
c) resulting rectangular signal with DC offset voltage.
Figure 3B:
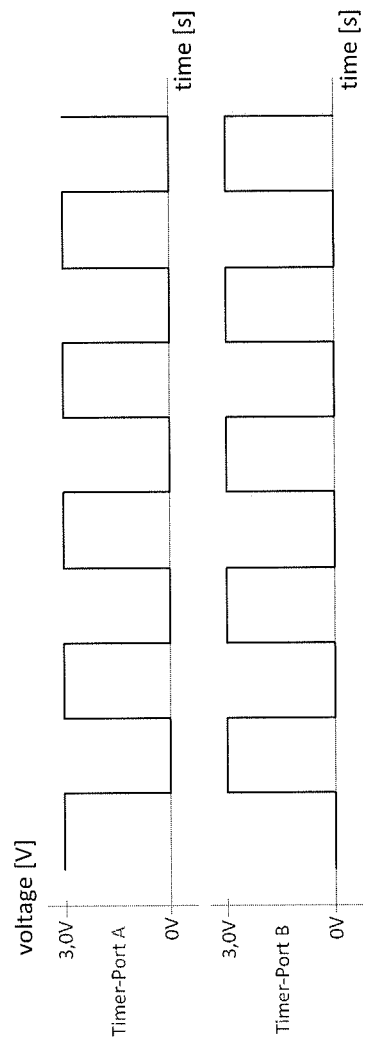
Figure 3C:
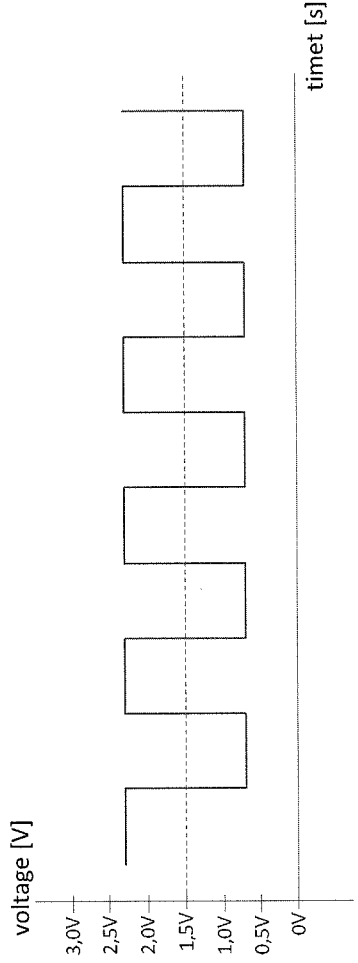

FIG. 3 shows production of the signal portion for the conductive operating mode. FIG. 3a provides a detail view of the two voltage dividers 11, 11a of the invention and their connection to the two ports/outputs (A and B) 12, 12a of the microcontroller 8. When one measuring range is active, the respectively other measuring range is decoupled by the switching of the corresponding port/output A or B with the respective pins to the so-called tri-state. Therefore, the curves shown in FIG. 3b result for the exciter signal as a function of time. Since the measuring system is preferably supplied with an operating voltage ($U_b$) and the signal registration via the microcontroller 8 is performed by means of an ADC 18, it is advantageous to keep the alternating voltage signals at half operating voltage level. This is shown in FIG. 3c for the example of an operating voltage of $3V_{dc}$.

Figure 4A:
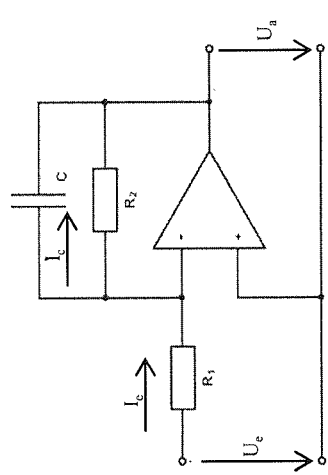
FIG. 4 is an illustration of the production of the signal portion for the capacitive operating mode
a) sketch of an integration amplifier,
b) output signal from the third port/output of the microcontroller,
c) triangular signal as a function of time.
Figure 4B:
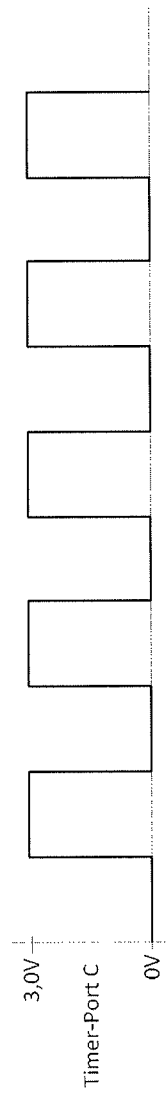
Figure 4C:
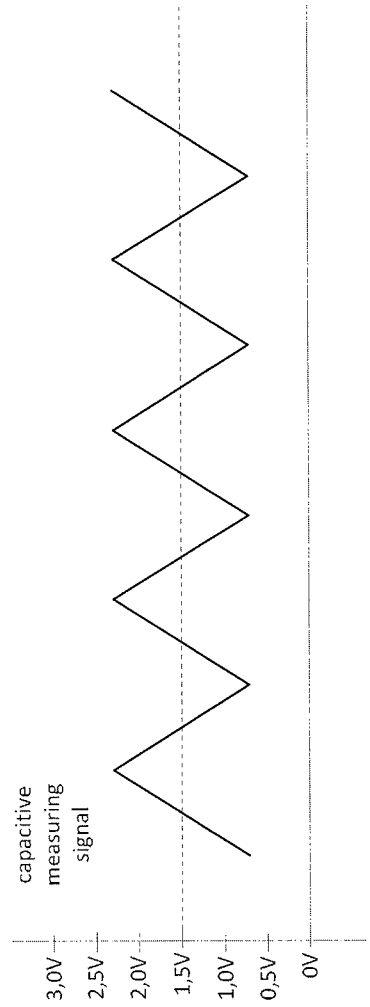

FIG. 4 sketches in analog manner the production of the signal portion for the capacitive operating mode. In such case, FIG. 4a shows an integration amplifier, such as used in block A 14. The rectangular output signal of the microcontroller 8 is shown in FIG. 4b. The integration amplifier 14 converts such into a triangular signal, which is shown in FIG. 4c, also again as a function of time. The reference voltage on the positive input of the integration amplifier 14 must, in such case, be set at 50% of the operating voltage of the microcontroller 8, in order that the different signals of the sensor system not cause offset differences. Analogously to the two measuring ranges for the conductive operating mode, during the capacitive operating mode the two port outputs A and B are switched with the respective pins to the tri-state.

Figure 5:
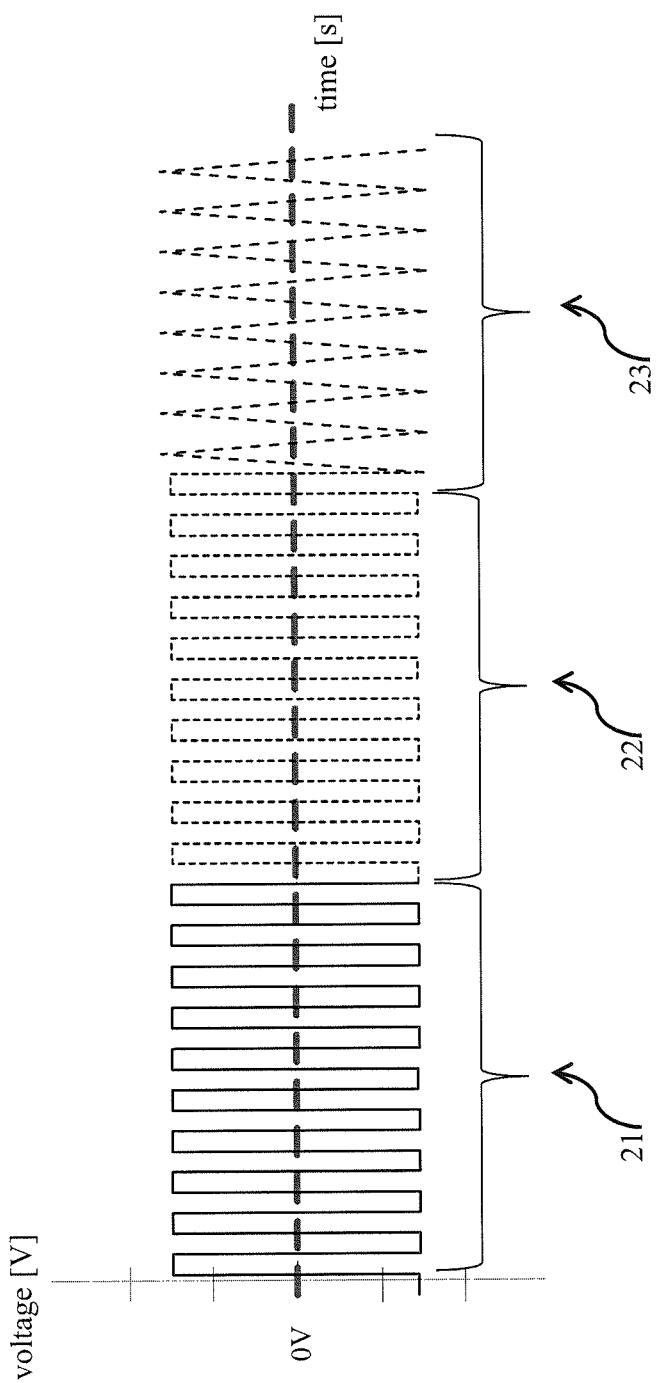
FIG. 5 is the exciter signal composed of the signal components as a function of time.

FIG. 5 shows as a function of time the exciter signal composed of the two signal components. The measured value registering of the capacitive and conductive operating modes occurs sequentially. In the example shown here, in a first interval, a first conductive signal component 21 is produced, in a second interval a second conductive signal component 22 is produced, and in a third interval, finally, a capacitive signal component 23 is produced, here in the form of a triangular signal. The presence of two conductive signal components 21.22 is caused by the application of two voltage dividers for strongly, respectively weakly, conductive media.

Figure 6:
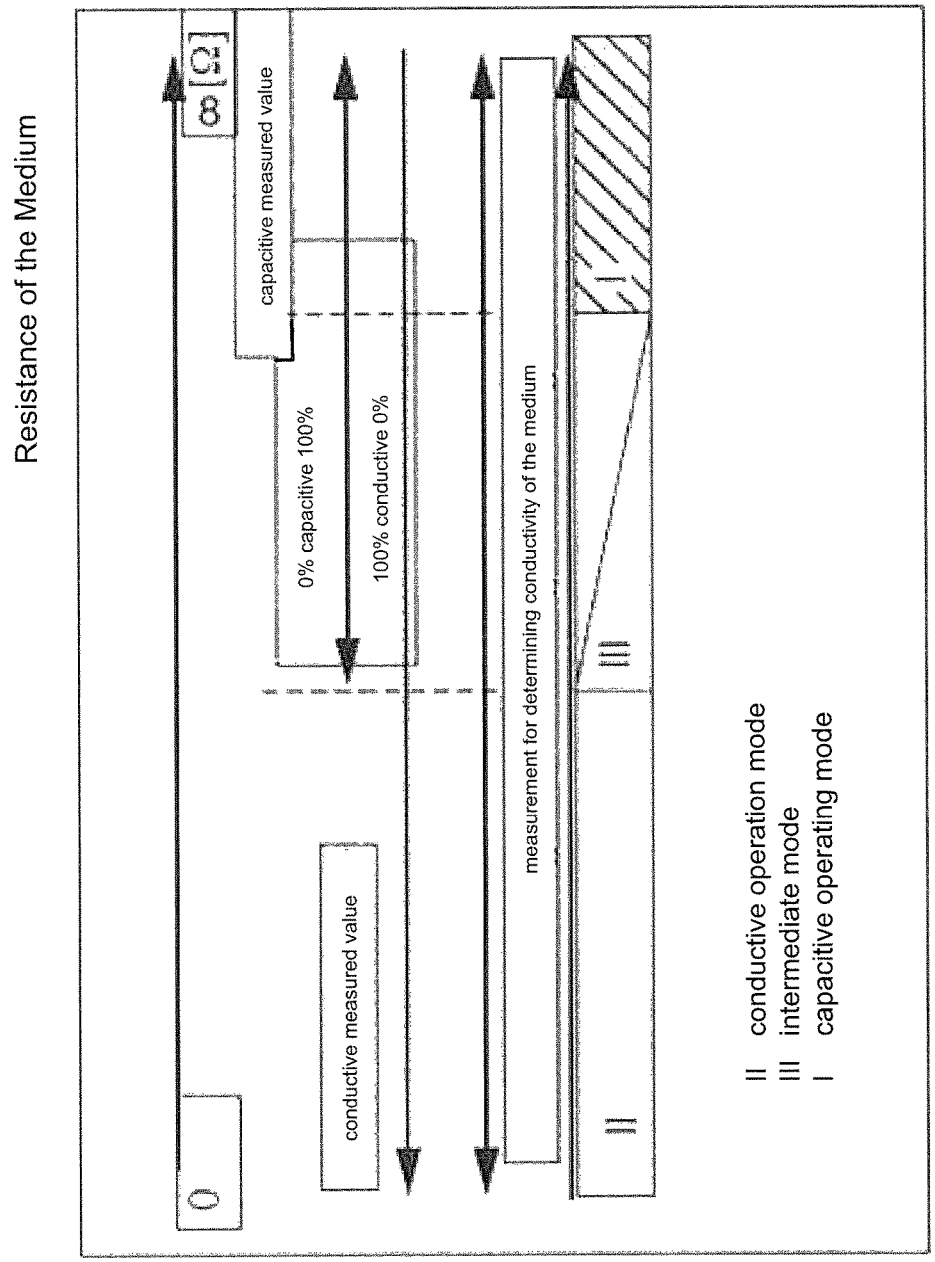
FIG. 6 is a sketch of the method of weighting the measured values in the transitional region.

FIG. 6 illustrates the method of claim 5, wherein the response signals measured in the capacitive and conductive operating modes for media with electrical conductivities in a transitional range between non-conductive and conductive are averaged and weighted. This method is described in the non-prepublished German Application, DE102013102055.0 application filed on Mar. 1, 2013. In such case, 3 regions are distinguished: In the case of non-conductive media or media with a small conductivity (I), the response signals of the capacitive measuring are evaluated. In such case, the preferred resistance range lies preferably in the range, 300 kΩ to infinity. In the case of media with a high electrical conductivity (II), the response signals produced in the conductive operating mode are evaluated, wherein here there is a further subdividing via the two voltage dividers. In a transitional region (iii) between these two regions I and II, the response signals ascertained in the conductive and capacitive operating modes are evaluated. In this regard, the two respective response signals are provided as a function of the conductivity of the medium with suitable weighting factors, which, for example, can lie between 0% and 100% and move in opposite directions such that they add to 100%. This transitional region III corresponds preferably to a resistance range from 300-3000 kΩ.

Finally, FIG. 7 concerns the ESD protection circuit 20. FIG. 7a shows a circuit according to state of the art. Shown are two bleeder resistors 24.24a, which are present in order that no direct voltage potential can build up on the electrodes of the measuring probe, e.g the measuring electrode 5 and the guard electrode 6. The diode circuit 25 serves, in such case, for ESD protection and is connected with ground 26. The bleeder resistors in the illustrated configuration have, however, also parasitic capacitances, which act negatively on the achievable measuring resolution.

Therefore, the ESD protection circuit 20 is appropriately modified according to the invention in FIG. 7b. The bleeder resistors 24, 24a for measuring electrode 1 are both led to the guard electrode 6, in order that the parasitic capacitances of the bleeder resistors 24, 24a have no influence on the evaluation of the response signals produced by the measuring probe 1 and, thus, have no influence on the monitoring of the fill level. Also the modified configuration prevents the build up of a direct voltage potential, since such can be built up via the guard electrode 6. Also, the diode circuit 25 is connected with the guard electrode 6, in order to avoid influence of parasitic capacitances on the measuring.

The invention claimed is:

1. A method for monitoring a predetermined fill level of a medium in a container with at least one measuring probe and an electronics unit, comprising the steps of:
   operating the measuring probe alternately in a conductive and in a capacitive operating modes,
   supplying the measuring probe with an exciter signal, which is composed of two different, time alternatingly sequential, periodic signal components;
   generating in a first time interval a first periodic signal component for the conductive operating mode and in a second time interval a second periodic signal component for the capacitive operating mode, wherein a rectangular signal is used for said exciter signal in said first time interval and a triangular signal or sine signal is used in said second time interval, and wherein a response signal in both time intervals is a rectangular signal;

ascertaining from said response signal obtained from the measuring probe, which depends on said first and second signal component, whether the predetermined fill level has been reached according to the capacitive or conductive operating mode; and generating a report upon an exceeding or subceeding of this fill level;

wherein in the case of non electrically conductive media said response signal obtained during application of the capacitive operating mode is evaluated;

in the case of electrically conductive media said response signal obtained during application of the conductive operating mode is evaluated; and for media with conductivity within a transitional region, said response signal of both operating modes are evaluated and measured values won from said response signal are provided with corresponding weighting factors as a function of a conductivity of the medium.

2. The method as claimed in claim 1, wherein:
said rectangular signal and said triangular signal are so sized that they have the same arithmetic average value.

3. The method as claimed in claim 1, wherein:
at least one medium specific property is ascertained from said response signal.

4. An apparatus for monitoring a predetermined fill level of a medium in a container, comprising:
at least one measuring probe and an electronics unit, wherein:
said electronics unit is so embodied that measuring probe is operated alternately in a conductive and a capacitive operating mode;
said measuring probe is supplied with an exciter signal, which is composed of two different, time alternatingly sequential, periodic signal components, wherein in a first time interval a first periodic signal component is generated for the conductive operating mode and in a second time interval a second periodic signal component is generated for the capacitive operating mode, wherein a rectangular signal is used for said exciter signal in said first time interval and a triangular signal or sine signal is used in said second time interval, and wherein a response signal in both time intervals is a rectangular signal; and
from said response signal obtained from the measuring probe, which depends on the actual signal component, it is ascertained, whether the predetermined fill level has been reached according to the capacitive or conductive operating mode; and
a report is generated upon an exceeding or subceeding of this fill level;
wherein in the case of non electrically conductive media said response signal obtained during application of the capacitive operating mode is evaluated;
in the case of electrically conductive media said response signal obtained during application of the conductive operating mode is evaluated; and
for media with conductivity within a transitional region, said response signal of both operating modes are evaluated and measured values won from said response signal are provided with corresponding weighting factors as a function of a conductivity of the medium.

5. The apparatus as claimed in claim 4, further comprising:
a module for generating said rectangular signal and a module for generating said triangular signal or sinusoidal signal.

6. The apparatus as claimed in claim 4, wherein:
said measuring probe is composed of a sensor electrode and a guard electrode.

7. The apparatus as claimed in claim 6, further comprising:
at least one measuring resistor, via which in the conductive operating mode a ratio of an electrical current through said sensor electrode and an electrical current through said guard electrode is determined.

8. The apparatus as claimed in claim 4, further comprising:
at least one voltage divider for generating the first periodic signal component in the conductive operating mode.

9. The apparatus as claimed in claim 7, further comprising:
at least one difference amplifier, with which in the capacitive operating mode via said measuring resistor a difference of the voltages on said sensor electrode and said guard electrode is determined.

10. The apparatus as claimed in claim 6, further comprising:
an ESD protection circuit, comprising at least one diode circuit and one bleeder resistor, wherein:
said at least one diode circuit and said at least one bleeder resistor are connected with said guard electrode and via said guard electrode with a ground connection.

11. The apparatus as claimed in claim 4, wherein:
said measuring probe is so embodied that after installation in the container in a region facing the medium it is essentially flush with a wall of the container or at least partially protrudes inwardly into the container.

* * * * *